Figure 1:
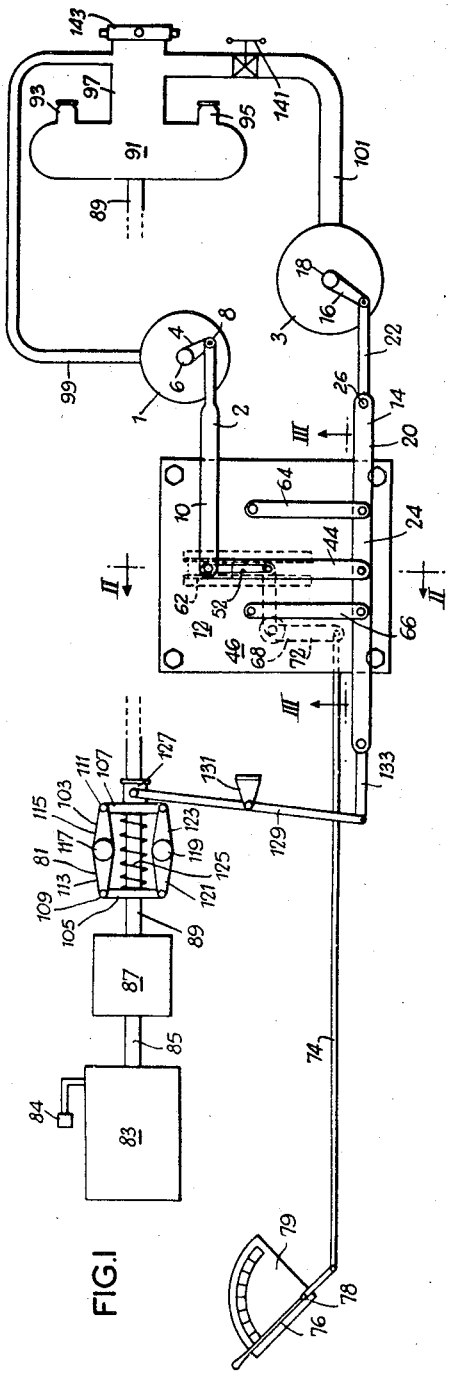

July 26, 1960 A. JOSEPH 2,946,236
APPARATUS FOR POSITIONING A FIRST MOVABLE MEMBER IN DEPENDENCE
UPON THE POSITION OF A SECOND MOVABLE MEMBER
Filed March 28, 1958 3 Sheets-Sheet 1

Inventor
Alphonse Joseph
By
Pennie, Edmonds, Morton, Barrows & Taylor
Attorneys

July 26, 1960 A. JOSEPH 2,946,236
APPARATUS FOR POSITIONING A FIRST MOVABLE MEMBER IN DEPENDENCE
UPON THE POSITION OF A SECOND MOVABLE MEMBER
Filed March 28, 1958 3 Sheets-Sheet 2

Inventor
Alphonse Joseph
By
Pennie, Edmonds, Morton, Barrows & Taylor
Attorneys

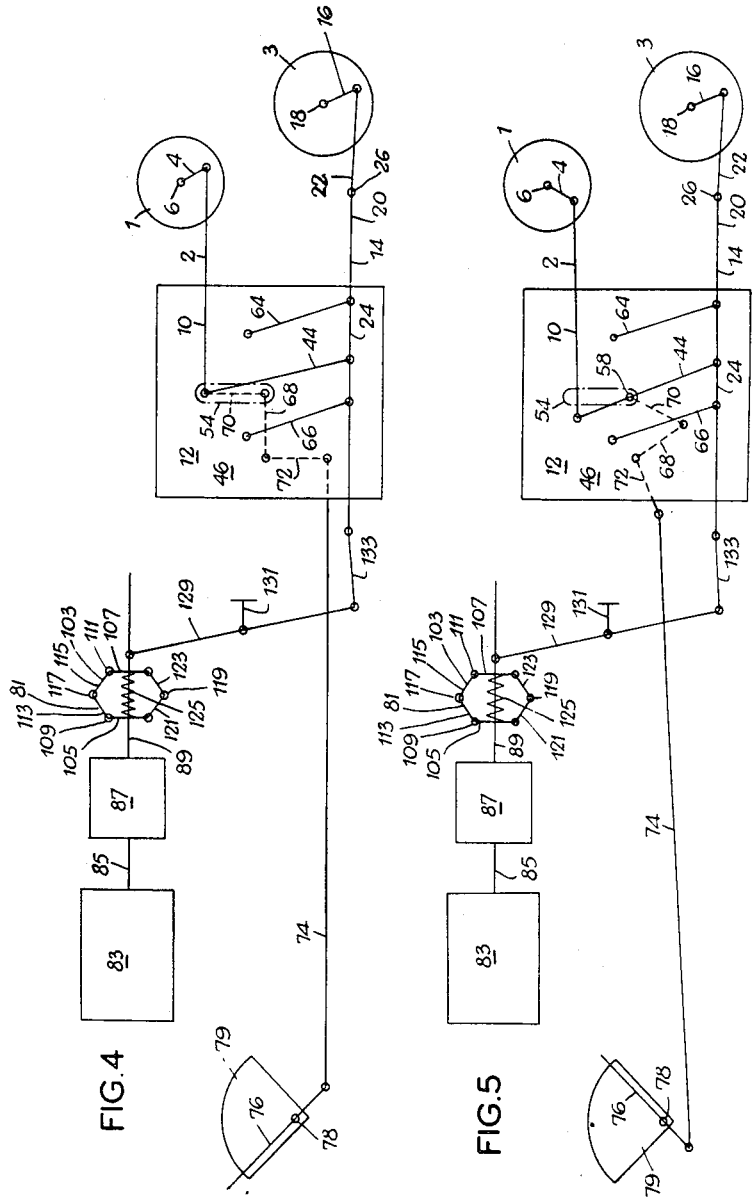

United States Patent Office 2,946,236
Patented July 26, 1960

2,946,236

APPARATUS FOR POSITIONING A FIRST MOVABLE MEMBER IN DEPENDENCE UPON THE POSITION OF A SECOND MOVABLE MEMBER

Alphonse Joseph, London, England, assignor to James Whitson and Company Limited, West Drayton, England, a British company Filed Mar. 28, 1958, Ser. No. 724,654

Claims priority, application Great Britain May 30, 1957

2 Claims. (Cl. 74—480)

This invention relates to apparatus for positioning a first movable member in dependence upon the position of a second movable member. Frequently, it is desirable to control flow through a first valve in dependence upon flow through a second valve in which case movement of the first movable member serves to control the extent of opening of the first valve whilst movement of the second movable member serves to control the extent of opening of the second valve. Thus, for example in the art of fire fighting, when employing foam to extinguish fires, a liquid mixture of water and foam compound is led through a hose pipe to a nozzle which incorporates a foam generator and in order to generate foam of desired quality one important consideration is to ensure that the liquid mixture supplied to the foam generator contains suitable proportions of water and foam compound. To this end, it is desirable to control the flow of foam compound in dependence upon the flow of water. Moreover, because of the sticky nature of most types of commercially available foam compound it is important that foam compound alone should not be allowed to flow through the hose pipe and the lines leading thereto, as these may become blocked.

Accordingly it is an object of the invention to provide improved apparatus for positioning a first movable member in dependence upon the position of a second movable member. A further object is to provide such apparatus in which, where the first and second movable members constitute valve elements, when the second valve is closed, movement of means which would otherwise effect opening of the first valve does not result in opening of the first valve.

It will be appreciated that the invention is not confined to its application in fire fighting and is useful in any instance where the position of a first movable member is to be controlled in dependence upon the position of a second movable member and where means which would normally be moved so as to effect movement of the first movable member in dependence upon the position of the second movable member are rendered ineffective as regards the movement of the first movable member if the second movable member is in a predetermined position thereof.

Figure 2:
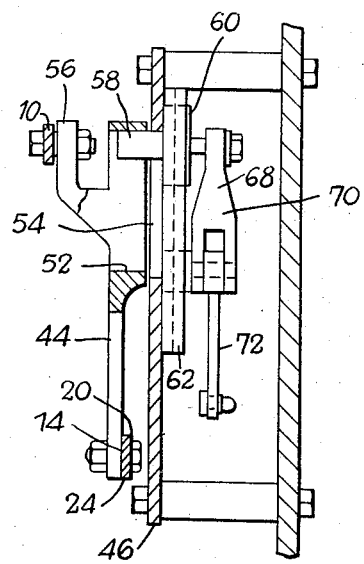
Figure 3:
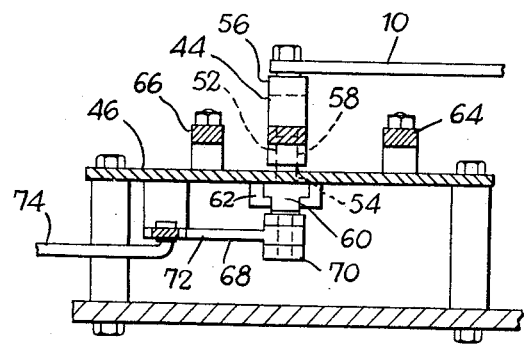

The invention will now be described, by way of example, with reference to the accompanying, somewhat diagrammatic drawings, in which:

Figure 1 is a plan view of apparatus for positioning a first movable member in dependence upon the position of a second movable member, said members comprising valve elements and the apparatus being installed in a fire crash tender so that the first valve serves to control flow of foam compound whilst the second valve serves to control flow of water, Figures 2 and 3 are views taken respectively on the lines II—II and III—III of Figure 1, and Figures 4 and 5 are diagrammatic plan views illustrating different positions of the apparatus shown in the other figures.

Referring to the drawings, apparatus for controlling flow through a first valve 1 which serves as foam compound flow controlling valve, in dependence upon flow through a second valve 3 which serves as a water flow controlling valve, includes a first actuating mechanism 2 having a first link 4 secured at one end to an operating spindle 6 constituting the first movable member of the first valve 1 and pivotally connected at the other end thereof by means of a bolt 8 to one end of a second link 10 the opposite end of which is pivotally mounted upon linkage means generally indicated by the reference numeral 12 and hereinafter described. The apparatus also includes a second actuating mechanism 14 having a first member 16 fixed at one end to an operating spindle 18 constituting the second movable member of the second valve 3 and pivotally mounted at the opposite end thereof to one end of a second member 20 of the second actuating mechanism. The member 20 comprises two parts 22 and 24 pivotally secured together at 26 between the member 16 and the linkage means 12, the part 22 being pivotally connected to the member 16 whilst the part 24 at a point spaced from the pivotal connection 26 is pivotally connected to the linkage means 12.

The linkage means 12 of the apparatus are connected to the first and second valve actuating mechanisms 2 and 14. To this end the linkage means includes an executive part or lever 44 arranged to move over the surface of a plate 46 which is supported on a suitable base. The lever 44 is pivotally mounted at one end thereof upon the part 24 of the member 20 of the second actuating mechanism 14 and towards the end of the lever 44 opposite the part 24 there is provided a longitudinally extending slot 52 which, in a predetermined position of the lever 44, namely, that shown in Figures 1 to 3, registers with a corresponding slotted aperture 54 formed in the plate 46. The lever 44 is formed with a bifurcation 56 which extends parallel with the slot 52 and upon which, at the end thereof remote from the part 24, is pivotally mounted the link 10 of the first valve actuating mechanism 2. The pivotal connection between the bifurcation 56 and the link 10, in the position of the apparatus shown in Figures 1 to 3, is coaxial with a pivot 58 which is arranged for movement by a third actuating mechanism, hereinafter described, both in the slot 52 of the lever 44 and in the slotted aperture 54 of the plate 46. At the side of the plate 46 opposite the lever 44 the pivot 58 includes a block 60 engaged within parallel guides 62 which are secured to the plate 46 and extend respectively at opposite sides of the slotted aperture 54.

Also included in the linkage means 12 are parallel radius levers 64 and 66 of equal length respectively connected with the part 24 of the second valve actuating mechanism 14 on opposite sides of the lever 44. The ends of the levers 64 and 66 remote from the part 24 are pivotally connected to the plate 46 and the arrangement is such that the part 24 is constrained to move to positions parallel with itself.

For moving the pivot 58 in the slot 52 and slotted aperture 54 respectively of the lever 44 and plate 46, there is provided a third actuating mechanism 68 which includes a link 70 on one end of which is rotatably mounted the pivot 58 and the opposite end of which is pivotally connected to one end of a bell crank lever 72. The bell crank lever 72 is rotatably secured at the bend thereof to the plate 46 and on the end of the lever 72 remote from the link 70 is pivotally mounted a lever member 74 which is pivotally secured at the end thereof remote from the bell crank lever 72 to a manually operable arm 76 which is pivoted at 78 upon a graduated quadrant plate 79. Movement of the arm 76 across the quadrant plate 79 effects rotation of the bell crank lever 72 which thereby positions the pivot 58 relative both to the slotted aperture 54 in the plate 46 and the slot 52 in the lever 44. In this way, the extent of opening of the valve 1 upon opening of the valve 3 is determined.

For opening the water valve 3 there are provided driving means generally indicated by the reference numeral 81. The driving means 81 include an engine 83 which is the prime mover of the fire crash tender in which the apparatus is installed and the engine which has a throttle 84 is adapted to drive a shaft 85 which is coupled through a transfer gear box 87 to a transfer shaft 89. Rotation of the shaft 89 drives a pump 91 having outlets 93 and 95 to which fire hoses can be attached and an inlet 97 into which open outlets 99 and 101 respectively of the foam compound valve 1 and the water valve 3. The transfer shaft 89 constitutes part of the driving means 81 which operate to control the opening of the water valve 3. To this end, mounted on the shaft 89 and rotatable therewith is a centrifugally operated control device 103 which comprises spaced arms 105 and 107 each mounted at its centre on the transfer shaft 89 and of which the arm 105 is secured to the shaft 89 so as to be rotatable therewith whilst the arm 107 is freely mounted on the shaft 89. Upon corresponding ends 109 and 111 of the arms 105 and 107 are pivoted respective levers 113 and 115 which at inner ends thereof are pivotally secured to a ball weight 117. A further ball weight 119 is similarly provided on levers 121 and 123 between ends of the arms 105 and 107 remote from the respective ends 109 and 111 thereof and between the spaced arms 105 and 107 is mounted on the shaft 89 a helical return spring 125. As the transfer shaft 89 increases speed the ball weights 117 and 119 are urged outwardly and cause the arm 107 to move from the position shown in Figure 1 towards the arm 105 thereby compressing the spring 125 to a position such as that shown in Figures 4 or 5, whilst, as the transfer shaft 89 slows down and comes to rest, the spring 125 returns the arm 107 to the position shown in Figure 1.

The movement of the arm 107 is employed to effect opening and closing of the water valve 3 and to this end, upon a collar part 127 of the arm 107 is pivotally secured one end of a lever 129 which is rotatably mounted between opposite ends thereof on a pivot 131 and pivotally connected at an end thereof remote from the collar part 127 to a link 133 which in turn is pinned to an end of the part 24 of the second actuating mechanism 14 remote from the part 22 thereof. It will be apprehended that as the arm 107 of the control device 103 moves towards the arm 105, the lever 129 is rocked about the pivot 131 and thus causes the link 133 to push the parts 24 and 22 to the right as shown in Figure 1 so that rotation of the member 16 and valve spindle 18 to open the valve 3 is effected. Conversely, movement of the arm 107 away from the arm 105 effects movement of the parts 24 and 22 to the left as shown in Figure 1, with consequent closure movement of the valve spindle 18.

In Figure 4 the apparatus is shown in the position in which the second valve or water valve 3 is fully opened. In this position, rotation of the transfer shaft 89 has caused the arm 107 to move its full extent towards the arm 105 thereby effecting movement of the second actuating mechanism 14 to operate the valve spindle 18 and thereby open the water valve. Movement of the second actuating mechanism 14 involves movement of the part 24 which effects rotation of the parallel radius levers 64 and 66 the movement of which causes the lever 44 to turn in the same sense as the levers 64 and 66 and in so turning a slight longitudinal movement of the lever 44 relative to the pivot 58 takes place though such longitudinal movement is insufficient to effect enough movement of the links 4 and 10 of the first actuating mechanism 2 to cause the first valve or foam compound valve 1 to open.

The position shown in Figure 5 is that in which both the valves are fully opened. The second actuating mechanism 14 is in the position described with reference to Figure 4 and the arm 76 has been fully rotated in a clockwise sense thereby moving the lever member 74 to the left and rotating the bell crank lever 72 in a clockwise sense which rotation effects movement of the link 70 and, therefore, of the pivot 58 in the slot 52 and slotted aperture 54 respectively of the lever 44 and plate 46 towards the end of the lever 44 to which is connected the second actuating mechanism 14. As the pivot 58 moves along the slot 52 and slotted aperture 54 the lever 44 rotates from the position thereof shown in Figure 4 to that shown in Figure 5 and such rotation is accompanied by movement of the links 10 and 4 of the first actuating mechanism 2 the movement of the link 4 effecting opening of the first valve 1 through rotation of the spindle 6.

It will be appreciated that clockwise rotation of the arm 76 from the position shown in Figure 1, that is to say the position where the second valve 3 is closed, will effect movement of the pivot 58 in the slot 52 and slotted aperture 54 but since the slots are in register no movement of the lever 44 takes place and, therefore, opening of the first valve 1 is prevented. Moreover, at positions of the arm 76 and the arm 107 intermediate their extents of travel, the second valve or water valve 3 is opened by an amount dependent upon the position of the arm 107 and therefore of the second actuating mechanism 14 whilst the first valve or foam compound valve 1 is open to an extent dependent both on the position of the mechanism 14 and on the position of the arm 76 which determines the position of the linkage operating means 68.

It will be appreciated that during operation of the apparatus foam compound cannot flow to the outlet 99 of the valve 1 without water flowing to the outlet 101 of the valve 3. Thus clogging of the pump 91 with foam compound or clogging of the hoses leading from the outlets 93 and 95 of the pump 91 with foam compound cannot occur. Moreover, inadvertent turning off of the water valve 3 will automatically and simultaneously cut off the supply both of water from the valve 3 and foam compound from the valve 1 to the pump 91. In addition, when enough foam has been generated the system can be cleaned by returning the arm 76 to the position indicated in Figure 1 and allowing the second valve 3 to remain open for a short time.

In operation, the fire crash tender carrying the apparatus described is driven to the scene of a fire and upon arrival at the scene of the fire the driver of the vehicle moves a lever which effects coupling of the main shaft 85 through the transfer gear box 87 with the transfer shaft 89. Hoses provided at their discharge ends with foam generators, of suitable form, are coupled to the outlets 93 and 95 of the pump 91. The arm 76 is then suitably positioned relative to the quadrant plate 79 and the throttle 84 of the engine 83 is depressed. In this way, water and foam compound are supplied through the outlets 101 and 99 respectively of the valves 3 and 1 to the pump 91 in proportions determined by the setting of the arm 76. Upon release of the throttle 84, both the valves 3 and 1 are automatically closed. If desired, the pump 91 and hoses attached to the outlets 93 and 95 of the pump can be flushed with water by moving the arm 76 back to the position illustrated in Figure 1 and depressing the throttle 84 once again for a short period.

When a water supply local to the scene of the fire is available, the water supply in the tank of the fire crash tender is first employed and then a valve 141 in the outlet pipe 101 of the valve 3 is closed. A suction eye 143 is then removed from the pump 91 and the pump is then connected to the local supply of water. Foam compound is then supplied through the pipe 99 to the pump 91 in the manner already described whilst the pump 91 is driven by the transfer shaft 89 to admit water thereto from the local source of supply.

It will be appreciated that the apparatus instead of being employed on a fire crash tender could be used in a permanent installation in which event, the transfer gear box 87 and transfer shaft 89 could be dispsensed with and a direct drive from the prime mover could be employed. Also, the prime mover could be of any suitable form either an internal combustion engine, or, for example, an electric motor.

The valves 1 and 3 are preferably of the kind having a casing in the form of an elbow, one end of which constitutes an inlet whilst the other end is of dome form and is apertured to provide an outlet. Coaxial with the arm of the elbow leading to the outlet there is provided a rotary operating spindle carrying a valve closure member arranged, through rotation of the spindle, to traverse the apertured dome outlet of the valve.

I claim:

1. Apparatus for positioning a first movable member in dependence upon the position of a second movable member comprising a first actuating mechanism for effecting positioning of the first movable member and a second actuating mechanism for effecting positioning of the second movable member, linkage means including a lever pivotally connected at opposite ends thereof respectively to said first and second actuating mechanisms, and formed with a longitudinally extending slot disposed towards the end of said lever adjacent the pivotal connection thereof with the first actuating mechanism, a fixed plate formed with a slotted aperture which, when the second actuating mechanism is located in a predetermined position thereof, is disposed in register with said longitudinally extending slot in said lever, and a third actuating mechanism including a pivot which engages within said longitudinally extending slot in said lever and said slotted aperture in said plate, a manually movable arm coupled to said pivot and a graduated plate on which said manually operable arm is pivotally mounted so that movement of said arm causes movement of said pivot within the slotted aperture in the plate and the longitudinally extending aperture in the lever, the arrangement being such that, when the second actuating mechanism is in a position other than said predetermined position thereof, movement of said manually operable arm causes movement of said lever of the linkage means to effect movement of the first actuating mechanism to an extent determined by the position of the second actuating mechanism and the position of the manually operable arm of the third actuating mechanism, whilst, when the second actuating mechanism is disposed in said predetermined position thereof, movement of said manually operable arm causes movement of said pivot of the third actuating mechanism along said slotted aperture in said plate and said longitudinally extending aperture in said lever of the linkage means without causing movement of the first actuating mechanism.

2. Apparatus as claimed in claim 1, wherein said lever of the linkage means at the end thereof adjacent the pivotal connection with the first actuating mechanism is formed with a bifurcation which is disposed on a side of said lever opposite said plate and the first actuating mechanism is pivotally connected to said bifurcation at a location which is co-axial with the pivot of the third actuating mechanism when the said lever of the linkage means is disposed in said predetermined position thereof.

References Cited in the file of this patent

UNITED STATES PATENTS

| | | |
|---|---|---|
| 846,307 | Hobart | Mar. 5, 1907 |
| 1,149,002 | Stead | Aug. 3, 1915 |
| 1,781,298 | Prutzman | Nov. 11, 1930 |
| 1,919,616 | Boyd | July 25, 1933 |
| 2,154,642 | Smith | Apr. 18, 1939 |
| 2,170,982 | Ellinwood | Aug. 29, 1939 |
| 2,750,808 | Mills | June 19, 1956 |
| 2,769,500 | Clifford | Nov. 6, 1956 |